Patented Sept. 25, 1951

2,569,422

UNITED STATES PATENT OFFICE 2,569,422

ALPHA-HYDROXYDECANOIC ACID

Charles L. Levesque, Philadelphia, Pa., assignor to Rohm & Haas Company, Philadelphia, Pa., a corporation of Delaware No Drawing. Application November 18, 1949, Serial No. 128,253

3 Claims. (Cl. 260—535)

This invention concerns a highly branched alpha-hydroxycarboxylic acid which is liquid at room temperatures and even at much lower temperatures, which is a useful chemical intermediate, and which is a powerful plasticizer for zein. This invention deals also with a method for preparing this acid.

Hydroxycarboxylic acids with four or more carbon atoms which have heretofore been known have with a single exception been solids at room temperatures. In fact, most of the hydroxy-monocarboxylic acids heretofore known melt above 65° C. Usually a hydroxycarboxylic acid melts higher than the normal acid from which it may be considered to be derived. The previously known hydroxycarboxylic acids stand in sharp contrast with the acid of this invention. These acids have lacked the properties which give the acid of this invention its particular and peculiar utility as a plasticizer.

This acid, 2-hydroxy-4,6,6-trimethylheptanoic acid, is derived from 3,5,5-trimethylcaproaldehyde, which may also be identified as 3,5,5-trimethyl hexaldehyde or hexanal, by converting this aldehyde to the cyanohydrin, as by reaction with hydrogen cyanide; and hydrolyzing the cyanohydrin in the presence of a strong acid. The hydroxycarboxylic acid is separated as an oil which is soluble in organic solvents and insoluble in water.

It may be purified by being treated with an alkali and converted to a salt such as the sodium or calcium salt, which is separated and treated with a strong acid such as hydrochloric or sulfuric to liberate the acid. When 2-hydroxy-4,6,6-trimethylheptanoic acid is heated, particularly in the presence of an acidic catalyst, water can be taken off and a self-ester formed. On prolonged heating there are formed polyesters which are linear and which have high molecular weights.

The trimethylcaproaldehyde is obtained from the reaction of diisobutylene, carbon monoxide, and hydrogen in the presence of a cobalt catalyst. This reaction of olefin, carbon monoxide, and hydrogen has long been known. It is carried out under pressures up to 1500 or more atmospheres at temperatures from 40° C. to 300° C. or more. The particular temperatures and pressures chosen depend one upon the other, as explained, for example, in U. S. Patent No. 2,327,066, and are so chosen as to give an optimum yield of trimethylcaproaldehyde, which is separated from a small amount of trimethylhexanol, usually concomitantly formed. See also P. B. Report No. 608, announced in the Bibliography of Scientific and Industrial Reports dated January 11, 1945, and F. I. A. T. Report No. 1000.

Trimethylcaproaldehyde is then reacted with hydrogen cyanide to give 2-hydroxy-4,6,6-trimethylheptonitrile. In the reaction with hydrogen cyanide the trimethylcaproaldehyde is held between −30° C. and 25° C. A small amount of potassium cyanide or about 0.5% to 5% of an amine, preferably a tertiary amine, such as pyridine, methyl piperidine, triethanolamine, tributylamine, or triamylamine is added as catalyst. Hydrogen cyanide is added with stirring and with control of temperature by external cooling. When an excess of hydrogen cyanide has been added, the mixture is warmed and stirred for a short time to ensure complete reaction. The catalyst is then neutralized with an acid such as acetic, sulfuric, or phosphoric. Excess hydrogen cyanide is swept out by sparging with nitrogen. The reaction mixture is filtered. The product thus obtained is quite pure hydroxytrimethylheptonitrile.

This cyanohydrin is converted to the alpha-hydroxycarboxylic acid by acid hydrolysis. This is accomplished by treating the trimethylheptonitrile with a strong mineral non-oxidizing acid and water. While sulfuric acid, hydrobromic acid and other strong acids may be used, hydrochloric is particularly desirable. Excess of a strong solution of acid can be added to the trimethylheptonitrile at a temperature between 0° C. and 30° C. and the mixture is then diluted with water and heated to complete the hydrolysis. Heating the aqueous mixture at 90° C. to 110° C. for an hour or two is sufficient to give an excellent yield of the desired acid. The reaction mixture is then treated with a water-insoluble organic solvent to take up the acid. Organic and aqueous layers are separated. When the organic layer is stripped, the acid is obtained in the residue.

There follow typical procedures for the preparation of 2-hydroxy-4,6,6-trimethylheptanoic acid, starting with 3,5,5-trimethylcaproaldehyde and proceeding through the 2-hydroxytrimethylheptonitrile.

*Example 1*

In a five-liter, four-neck flask equipped with thermometer, sealed stirrer, and reflux condenser there was placed a charge of 2000 grams of 3,5,5-trimethylcaproaldehyde to which 21 grams of triethanolamine was added. A jacketed buret was attached to the flask, the jacket being supplied with cold water from a coil in an ice bath. The buret was filled with liquid hydrogen cyanide drawn from a cylinder in an ice-salt bath. The charge was cooled below 10° C. by means of an ice bath and kept below 20° C. while liquid hydrogen cyanide was added. During the course of 1.5 hours a total of 565 ml. of hydrogen cyanide was run into the reaction mixture with good stirring. The ice bath was removed, the reaction mixture warmed to about 25° C., and the mixture stirred at room temperature for one hour. At this time 12 ml. of 85% phosphoric acid was added to destroy the catalyst. The reaction mixture was held under low pressure and heated to 45° C. for an hour to remove excess hydrogen cyanide. It was filtered through diatomaceous earth. There was obtained a clear, colorless, slightly viscous liquid in an amount of 2300 grams which contained by analysis 7.8% of nitrogen. It was 2-hydroxy-4,6,6-trimethylheptonitrile.

*Example 2*

To 600 parts by weight of this cyanohydrin there was slowly added with stirring 750 parts of concentrated hydrochloric acid over the course of 45 minutes. The temperature of the reaction mixture was kept below 40° C. by use of an ice bath. The reaction mixture was then stirred for 16 hours at ambient temperatures. There was added 710 parts of water and the mixture was heated under reflux for two hours. It was then cooled. Layers formed and were separated. The upper, organic layer was taken up in benzene. The resulting solution was washed with salt water and with water. It was then heated up to 80° C. under reduced pressure and volatile materials taken off. There was thus obtained 625 parts of a viscous oil which was soluble in naphtha and alcohol but insoluble in water. It had a saponification number of 298, acid number of 222, and hydroxyl number of 219. Theoretical values for all three numbers are 298. These analytical values showed that 74% of the product was alpha-hydroxydecanoic acid and 23% was self-ester.

A mixture of 95 parts of this product, 22 parts of sodium hydroxide, 100 parts of water, and 170 parts of methanol was heated for six hours at 75°–79° C. The reaction mixture was then made acid with concentrated hydrochloric acid. The solution was twice extracted with ethyl ether to separate the alpha-hydroxydecanoic acid. The ether solution of the acid was washed with water three times and dried over sodium sulfate. The ether was stripped off under reduced pressure to leave an oil which corresponded in composition to alpha-hydroxydecanoic acid.

When this oil was stripped at 30° C. under reduced pressure for three hours, it had an acid number of 291. The oil was again subjected to low pressure. At the end of a five-hour period the acid number was 284. The product then had a viscosity of Z on the Gardner-Holdt scale. Samples of the various products were stored at 10° C. and −40° C. for 16 hours. No crystals formed, although the colder samples were hard. These became fluid again at room temperature.

*Example 3*

There was placed in a reaction vessel equipped with stirrer, thermometer, and take-off tube connected through a trap to a vacuum pump 1141 parts by weight of 2-hydroxy-4,6,6-trimethylheptanoic acid and 1.2 parts of zinc chloride. The charge was heated and stirred at 200° C. for eight hours. The acid number was then 55. Heating was continued under low pressure for an additional 32 hours. The acid number was found to be 6.3. The product was a linear polyester with a molecular weight of about 9000.

When 2-hydroxy-4,6,6-trimethylheptanoic acid is dissolved in an alcohol solution of zein and films are formed from the solution, it is found that the films have good hardness and toughness. The films modified with the acid are superior in water-resistance to films from unmodified zein solutions. In this application the hydroxytrimethylheptanoic acid may be pure or it may contain appreciable proportions of self-ester. Excellent plasticizing is obtained in either case.

In addition to use as a plasticizer in zein 2-hydroxy-4,6,6-trimethylheptanoic acid is useful as a chemical intermediate, yielding esters, salts, resins, etc. reacting with aldehydes and ketones to form acetals, and reacting as a secondary alcohol to form acylated derivatives, halo acids, urethanes, etc.

I claim:

1. As a new chemical compound, 2-hydroxy-4,6,6-trimethylheptanoic acid.

2. A process for preparing 2-hydroxy-4,6,6-trimethylheptanoic acid which comprises reacting 3,5,5-trimethylcaproaldehyde with hydrogen cyanide to form 2-hydroxy-4,6,6-trimethylheptonitrile and hydrolyzing said nitrile in the presence of a strong acid.

3. The process of claim 2 in which the strong acid is hydrochloric acid.

CHARLES L. LEVESQUE.

REFERENCES CITED

The following references are of record in the file of this patent:

Beilstein Handbook, 4th ed. (1921), band 3, pp. 355 and 356.

Beilstein Handbook, 4th ed. (first sup.), 1929, bands 3 and 4, p. 129.

Stoughton, Chem. Abst. 35 (1941), 7402.